(12) United States Patent
Hubmann

(10) Patent No.: US 11,391,313 B2
(45) Date of Patent: Jul. 19, 2022

(54) WOOD SCREW

(71) Applicant: AVVIO GMBH & CO KG, Graz (AT)

(72) Inventor: Gerhard Hubmann, Graz (AT)

(73) Assignee: AVVIO GMBH & CO KG, Graz (AT)

( * ) Notice: Subject to any disclaimer, the term of this patent is extended or adjusted under 35 U.S.C. 154(b) by 184 days.

(21) Appl. No.: 16/608,016

(22) PCT Filed: Apr. 3, 2018

(86) PCT No.: PCT/AT2018/060071
§ 371 (c)(1),
(2) Date: Oct. 24, 2019

(87) PCT Pub. No.: WO2018/195571
PCT Pub. Date: Nov. 1, 2018

(65) Prior Publication Data
US 2021/0102570 A1    Apr. 8, 2021

(30) Foreign Application Priority Data

Apr. 25, 2017    (AT) .................................. A8004/2018

(51) Int. Cl.
*F16B 33/00*    (2006.01)
*F16B 25/00*    (2006.01)
(52) U.S. Cl.
CPC ...... *F16B 25/0052* (2013.01); *F16B 25/0047* (2013.01); *F16B 25/0063* (2013.01)
(58) Field of Classification Search
CPC ............. F16B 25/0052; F16B 25/0047; F16V 25/0063
USPC ......................... 411/417, 423, 408, 378, 418
See application file for complete search history.

(56) References Cited

U.S. PATENT DOCUMENTS

| | | | | |
|---|---|---|---|---|
| 2,301,181 A | * | 11/1942 | Ilsemann | F16B 39/30 411/309 |
| 5,273,383 A | * | 12/1993 | Hughes | F16B 25/0015 411/180 |
| 5,827,030 A | * | 10/1998 | Dicke | F16B 25/0015 411/387.4 |
| 6,698,987 B1 | * | 3/2004 | Dicke | F16B 25/0031 411/387.4 |
| 7,163,366 B2 | * | 1/2007 | Chen | F16B 25/0047 411/411 |

(Continued)

FOREIGN PATENT DOCUMENTS

| | | |
|---|---|---|
| DE | 202004020104 | 3/2005 |
| JP | 2004316875 | 11/2004 |
| WO | 2014191310 | 12/2014 |

OTHER PUBLICATIONS

International Search Report and Written Opinion of PCT/AT2018/060071 dated Jul. 5, 2018.

*Primary Examiner* — Gary W Estremsky
(74) *Attorney, Agent, or Firm* — Workman Nydegger

(57) ABSTRACT

A wood screw, including a cylindrical screw shank, at the end of which there is formed a tip, a screw head, which is formed at the other end of the screw shank, as well as a threaded section, which extends from the tip in the direction of the screw head, wherein the threaded section has a thread core and a thread winding having several threaded turns circulating the thread core, wherein several successive threaded turns have projections, which are formed alternatingly in essentially the direction of the screw head and in essentially the direction of the tip.

6 Claims, 3 Drawing Sheets

(56) References Cited

U.S. PATENT DOCUMENTS

| | | | |
|---|---|---|---|
| 7,798,756 B2* | 9/2010 | Chang | F16B 25/10 |
| | | | 411/386 |
| 7,862,280 B2* | 1/2011 | Su | F16B 25/0052 |
| | | | 411/411 |
| 8,038,376 B2* | 10/2011 | Jung | F16B 39/30 |
| | | | 411/308 |
| 8,182,186 B2* | 5/2012 | Huber | F16B 25/0052 |
| | | | 411/386 |
| 9,651,079 B2* | 5/2017 | Park | F16B 25/0078 |
| 2018/0106287 A1* | 4/2018 | Eckert | F16B 25/0047 |

* cited by examiner

WOOD SCREW

The present application is a U.S. National Stage of International Application No. PCT/AT2018/060071, filed on Apr. 3, 2018, designating the United States and claiming the priority of Utility Patent Application No. A8004/2018 filed with the Austrian Patent Office on Apr. 25, 2017. All of the aforementioned applications are incorporated herein in their respective entireties by this reference.

The invention relates to a wood screw, including a cylindrical screw shank, at the end of which there is formed a tip, a screw head, which is formed at the other end of the screw shank, as well as a threaded section, which extends from the tip in the direction of the screw head, wherein the threaded section has a thread core and a thread winding having several threaded turns circulating the thread core.

In general, wood screws are intended for the attachment or connection of components made from wood or a wood-like material. For this purpose, they discretely cut a corresponding mating thread into the material, which serves to accommodate the forces arising at the screw. Conventional wood screws have a cylindrical screw shank having a cone-shaped tip and a screw head at the end of the screw shank opposite to the tip. A threaded portion extends from the tip along the direction of the screw head, which has a thread winding circulating a thread core. The thread winding itself is composed of several successive threaded turns. Such wood screws are tightened into a component with their tip leading, wherein the material of the component is displaced and cut by the wood screw.

An essential parameter for wood screws is the extraction force of the thread or the extraction capability, respectively, thereof. This is the holding force, which is provided by the screw thread tightened in the component for connecting the components screwed together. It is obvious that a wood screw should have a construction providing a high extraction force of the thread.

When tightening a wood screw, a pressure is generated by the material displaced, which acts on the tightened wood screw as well as within the component material. This pressure may disadvantageously have the effect that the component is exploded or destroyed, respectively, due to a splitting effect of the tightened wood screw while being tightening. The pressure that is generated upon tightening leads to an increased expenditure of force or an increased tightening torque, respectively, which has to be applied when tightening the wood screw. This gives rise to the disadvantage that a tightening torque that is too high will lead to the wood screw being twisted off while being tightening, thus effecting damage to the component. Furthermore, it would be desired that the wood screw have a releasing torque, which exceeds the tightening torque.

Wood screws according to prior art will generally cut the fibres of the material when they are tightened, thereby producing chips. These remain within the mate thread, which the wood screw cuts. This has the disadvantage that the tightening torque is increased and, simultaneously, the extraction force of the thread as well as the releasing torque are being reduced.

In prior art, there are known different embodiments of wood screws, which aim at providing a reduced tightening torque as well as a reduced splitting effect with simultaneously increased extraction force of the thread.

The WO 2014/191310, for example, discloses a wood screw, which provides an improved thread extraction force, for which purpose the material, into which the wood screw is tightened, is pushed towards the outside by means of elevations, which are arranged on the thread core, when being tightened.

It is the objective of the present invention to provide a wood screw, which further improves the properties mentioned and which prevents the disadvantages of prior art.

According to the invention the present task is solved by several successive threaded turns having projections, which are formed alternatingly in essentially the direction of the screw head and in essentially the direction of the tip.

The embodiment of the wood screw according to the invention contemplates that there are to be moulded projections to the threaded turns of the wood screws, which cause additional displacement of the material of the component, into which the wood screw is tightened, in the longitudinal direction of the wood screw between the threaded turns.

This displacements effects a reversible deformation of the material upon passage of one of the projections when the screw is twisted in, whereby the material then may return into the initial state. In this way, there is advantageously realized an additional attachment of the wood screw in the material of the component, and the thread extraction force is increased. Another advantage is that in the radial direction there does not occur any additional material displacement due to the projections and that the pressure is not essentially increased by the displaced material, whereby there is not given rise to an increased splitting effect by the wood screw according to the invention in comparison with prior art.

Advantageous embodiments of the wood screw according to the invention as well as alternative embodiment variants are explained in greater detail in the following by way of the figures.

Figure 1:
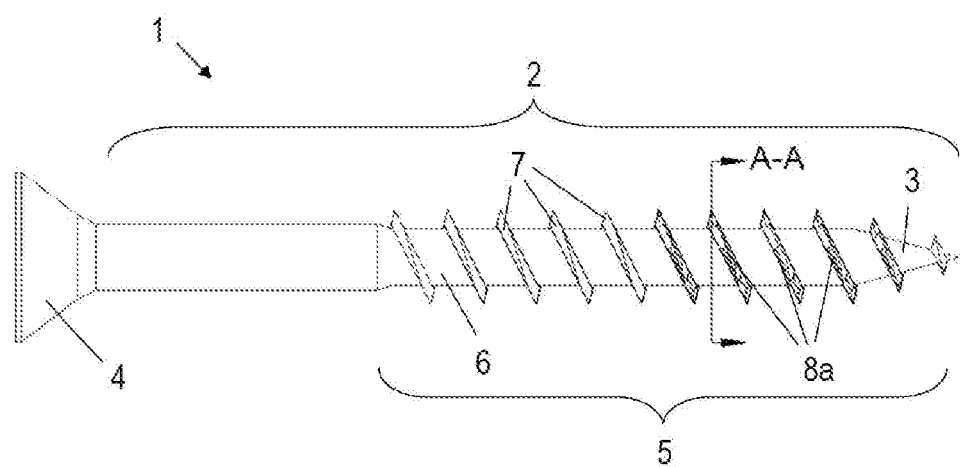
FIG. 1 shows an embodiment of a wood screw according to the invention in a side view.
Figure 1A:
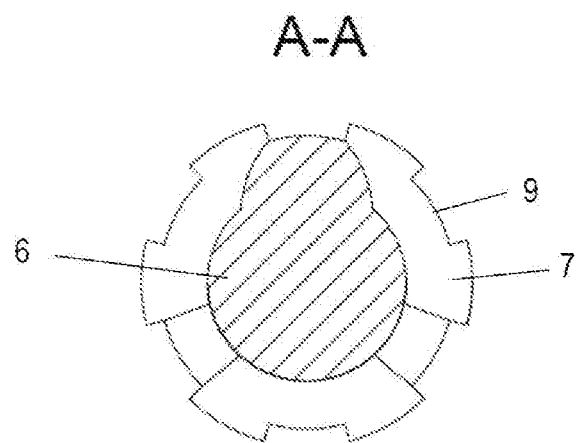
FIG. 1a shows a cross-sectional view through the wood screw of FIG. 1 along the intersecting line A-A indicated therein.

FIG. 1 shows an embodiment of a wood screw 1 according to the invention, wherein the wood screw 1 includes a cylindrical screw shank 2, which has a tip 3 on one end. On the opposite end, there is formed a screw head 4, which serves for accommodating a screwing device such as, e.g., a screw driver, a screwing device or a screw wrench. Therefore, the screw head 1 has a form that corresponds to any screw head drive. From the tip 3, a threaded section 5 extends in the direction of the screw head 4. This is composed of a thread core 6, which has a circulating thread winding having several successive threaded turns 7. The threaded section 5 may extend across the entire screw shank 2, or only across a part thereof, as depicted in the embodiment of FIG. 1. When twisting the wood screw 1 into a material of a component, the tip 3 is placed onto the material and the wood screw 1 is twisted in by means of the screwing device. Thereby, the wood screw 1 displaces the material and, in this way, discretely forms a mate thread therein.

In the embodiment depicted in FIG. 1, the threaded turns 7 have projections 8a, 8b across a part of the thread winding at the threaded turns 7, which are configured alternatingly in essentially the direction of the screw head 4 (projections 8a) and in the direction of the tip 3 (projections 8b). The projections 8a, 8b may extend across the entire thread winding, or only across portions thereof. The projections 8a, 8b cause an additional displacement of the material in the longitudinal direction of the wood screw 1 in-between the threaded turns 7.

When tightening the wood screw 1 of FIG. 1, the material between the threaded turns 7 is reversibly deformed by the projections 8a, 8b. This gives rise to the advantage that the fibres of the material will not be cut, and chips will not be produced, as chips, which remain within the thread cut into the material upon tightening, have an adverse influence on the tightening torque, the releasing torque and the thread extraction force.

When the wood screw 1 is being tightened, upon passage of a projection 8a, 8b, the material will return back to the threaded turn 7. When it is attempted to pull out or twist out the screw from the material, the projection will advantageously act as a retaining device, as this displacement of material has to be carried out again when removing the wood screw 1. It is especially advantageous in this connection that the projections 8a, 8b will not cause an additional displacement of material in radial direction and, in this way, will not contribute to an increased splitting effect.

Figure 2:
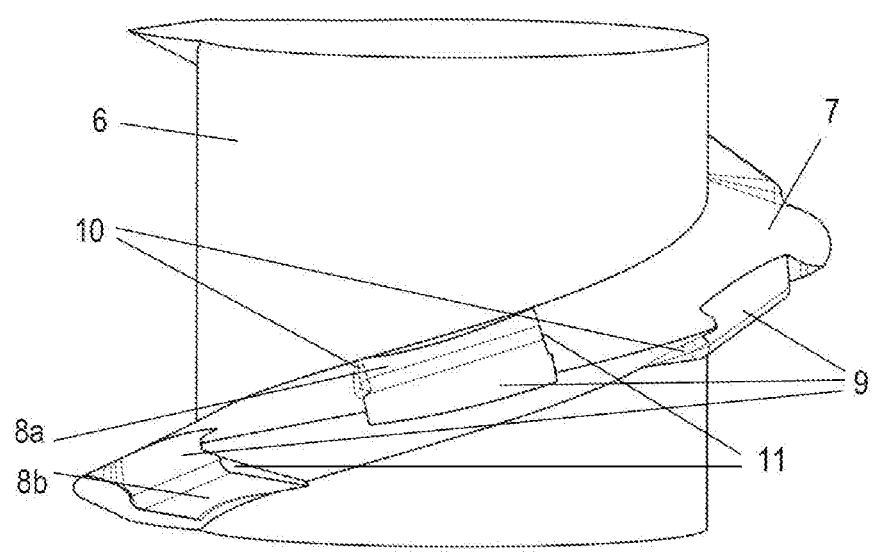
FIG. 2 shows an enlarged view of a cut-out of a thread winding of the wood screw according to the invention of FIG. 1.
Figure 2A:
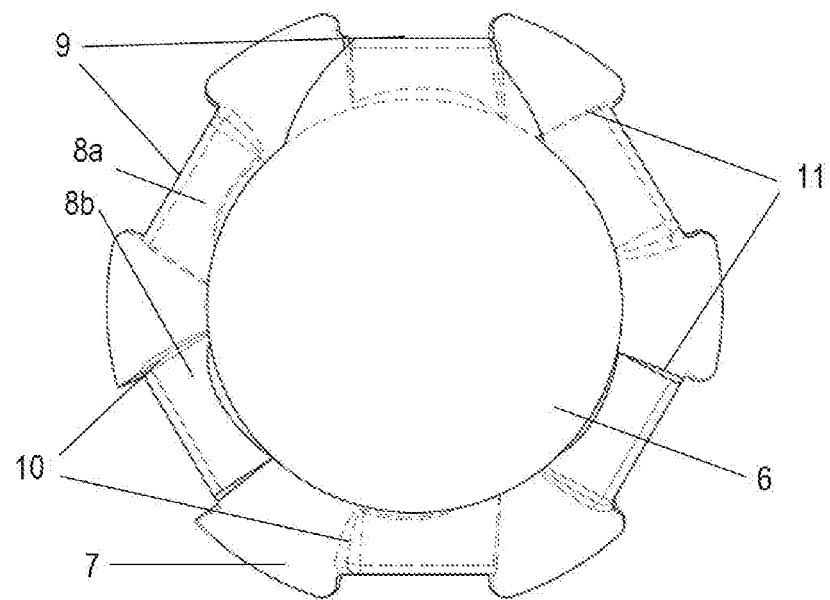
FIG. 2a shows a cross-sectional view through the enlarged view of the cut-out of the wood screw of FIG. 2 having a thread winding in a top view.

FIG. 2 shows an enlarged view of a portion of the threaded section 5 of the wood screw of FIG. 1, the threaded turns 7 of which having projections 8a, 8b. In the positions of the projections 8a, 8b, the depicted wood screw 1 has radial recesses 9 in the depicted preferred embodiment. This has the advantage that the splitting effect of the wood screw 1 according to the invention is additionally reduced. Especially preferably the recesses 9 extend across the entire extension of the respective projection 8a, 8b along the threaded turn 7, which is especially advantageous in regard to the splitting effect.

At the respective recesses 9, there is reduced a certain volume of screw material, which corresponds to that screw material volume from which the respective projections 8a, 8b are made. This configuration of the recesses 9 and the projections 8a, 8b is advantageous for the production since no screw material has to be removed from or supplied to the production process.

The projections 8a, 8b in FIG. 2 further have leading edges 10 and trailing edges 11. The leading edges 10 herein are those edges of the projections 8a, 8b, which will first come into contact with the material in the tightening direction of the wood screw 1. In the preferred embodiment the leading edges 10 are configured beveled. This has the advantage that the tightening torque is reduced.

The trailing edges 11, in contrast thereto, may have sharp edges, which are inclined essentially perpendicularly to the threaded turns 7. This configuration of the trailing edges 11 gives rise to the advantage that in this way there is obtained a locking effect, which greatly increases the releasing torque. Because of the sharp edges of the trailing edges 11, there is given the additional advantage that the thread extraction force is increased.

Figure 3:
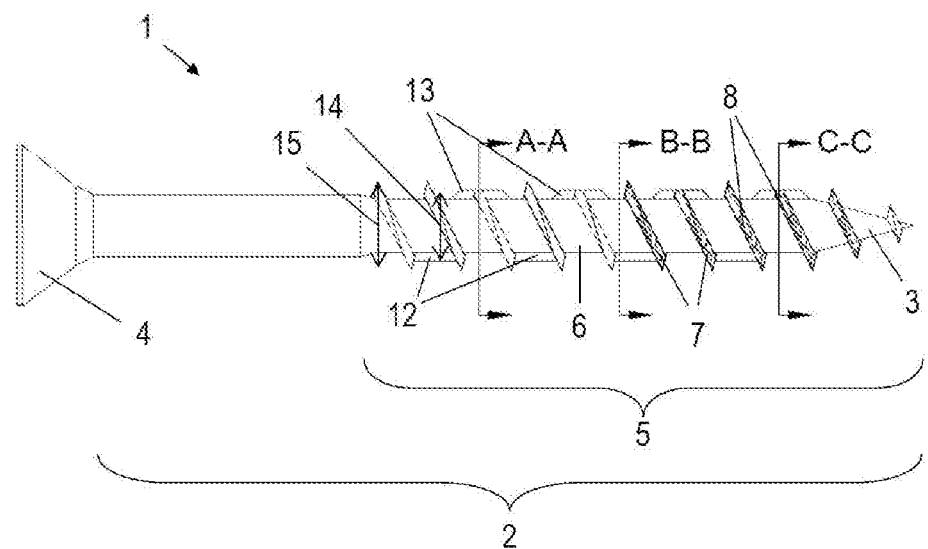
FIG. 3 shows a further embodiment of a wood screw according to the invention in a side view.
Figure 3A:
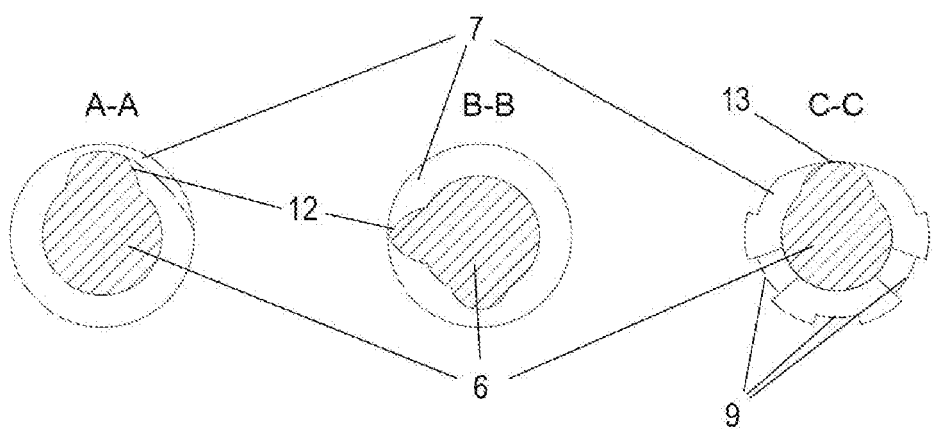
FIG. 3a shows cross-sectional views through the wood screw of FIG. 3 along the intersecting lines A-A, B-B and C-C indicated therein.

FIG. 3 shows a further embodiment of the wood screw 1 according to the invention, wherein the wood screw 1 has therein additional elevations 12 and 13 that extend radially outwards at the thread core 6 and along the threaded section 5. These extend from the tip 3 of the wood screw 1 in the longitudinal direction of the wood screw 1 to the screw head 4. In the embodiment depicted in FIG. 3, the elevations 12 and 13 are configured along the entire threaded section 5. In alternative embodiments, the elevations 12 and 13 may also be configured only on partial portions of the threaded section 5.

The elevations 12 and 13 may be divided into first elevations 12 spaced apart from each other and second elevations 13 spaced apart from each other, which are each arranged in a first straight row and in a second straight row on the thread core 6. The first elevations 12 and the second elevations 13 are diametrically opposing each other in the circumferential direction. The first elevations 12 are arranged in-between adjacent threaded sections 7, forming a connection there between. Alternatingly to the first elevations 12, the second elevations 13 are arranged in the longitudinal direction on the opposite side of the wood screw 1. A first elevation 12 thus always alternates with a second elevation 13. The second elevations 13 are configured respectively directly at a threaded turn 7 of the threaded section 5, wherein the second elevations 13 extend on both sides of a threaded turn 7 in the direction of the adjacent threaded turn 7. In contrast to the first elevations 12, the second elevations 13, however, do not connect the threaded turns 7 with each other but rather extend essentially as far as that position, in which on the opposite side of the wood screw 1 there is arranged respectively one first elevation 12.

Due to the alternating arrangement of the first elevations 12 and the second elevations 13, elevations 12 and 13 that are opposite to each other will never arise simultaneously in the longitudinal direction of the wood screw 1 but rather alternatingly. Hereby, there is realized a section-wise offsetting of the diameter of the thread core 6. In the process of tightening, this causes advantageously a tightening torque that is oscillating with the rotation of the wood screw 1 and is extremely low in total. In this way, the wood fibres advantageously are only laterally displaced temporarily but rather not cut and dispensed as chips.

As is visible in FIG. 3, the first elevations 12 and the second elevations 13 have an equally large first radial extension 14. The threaded turns 7 have a second radial extension 15, which in general exceeds this first radial extension 14. In the positions of the second elevations 13, the second radial extension 15 of the threaded turns, however, will be reduced to the value of the first radial elevations 14. This configuration of the radial extensions 14 and 14 has the advantage that the splitting effect of the wood screw 1 according to the invention will be further reduced.

The invention claimed is:

1. A wood screw, including a cylindrical screw shank, at the end of which there is formed a tip, a screw head, which is formed at the other end of the screw shank, as well as at least one threaded section, which extends from the tip in the direction of the screw head, wherein the threaded section has a thread core and a thread winding having several threaded turns circulating the thread core, wherein the several threaded turns have projections, which are formed alternatingly in essentially the direction of the screw head and in essentially the direction of the tip, wherein the threaded turns have radial recesses in positions of the projections, wherein each of the radial recesses extends across the entire extension of the corresponding projection along the threaded turns, and a volume of screw material is reduced at the respective radial recesses, which corresponds to a volume of screw material from which the respective projections are made.

2. The wood screw according to claim 1, wherein each of the projections comprises a volume of screw material, which corresponds to a volume of screw material reduced at the respective radial recess.

3. The wood screw according to claim 1, wherein the projections have leading edges and trailing edges, seen in the tightening direction of the wood screw, and wherein the leading edges are configured bevelled.

4. The wood screw according to claim 3, wherein the trailing edges are inclined essentially perpendicularly to the threaded turns.

5. A wood screw, including a cylindrical screw shank, at the end of which there is formed a tip, a screw head, which is formed at the other end of the screw shank, as well as at least one threaded section, which extends from the tip in the direction of the screw head, wherein the threaded section has a thread core and a thread winding having several threaded turns circulating the thread core, wherein the several threaded turns have projections, which are formed alternatingly in essentially the direction of the screw head and in essentially the direction of the tip, wherein the threaded turns have radial recesses in positions of the projections, wherein each of the radial recesses extends across the entire extension of the corresponding projection along the threaded turns, and a volume of screw material is reduced at the respective radial recesses, which corresponds to a volume of screw material from which the respective projections are made, wherein in the area of at least one threaded section at the thread core there are arranged several elevations extending radially outwards, which extend at least in some portions along the longitudinal direction of the wood screw, wherein the elevations include first elevations spaced apart from each other and second elevations spaced apart from each other, wherein the first elevations are arranged in a first straight row on the thread core and wherein the second elevations are arranged in a second straight row on the thread core, wherein the first elevations are diametrically opposed to the second elevations in the circumferential direction, wherein the first elevations are arranged in-between adjacent threaded turns and connected therewith, wherein the first elevations, seen in the longitudinal direction of the wood screw, are arranged alternatingly with the second elevations, and wherein the second elevation are molded respectively to one threaded turn of the threaded section and extend on both sides of this threaded turn in the direction of the respectively adjacent threaded turn, without reaching the adjacent threaded turns.

6. The wood screw according to claim 5, wherein the first elevations and the second elevations have a first radial extension and the threaded turns have a second radial extension, which corresponds in the position of the second elevations the first radial extension, otherwise exceeding the first radial extension.

* * * * *